United States Patent
Zhong et al.

(10) Patent No.: US 9,787,509 B2
(45) Date of Patent: *Oct. 10, 2017

(54) INFLUENCE CLOCK DATA RECOVERY SETTLING POINT BY APPLYING DECISION FEEDBACK EQUALIZATION TO A CROSSING SAMPLE

(71) Applicant: NVIDIA Corporation, Santa Clara, CA (US)

(72) Inventors: Lizhi Zhong, Sunnyvale, CA (US); Vishnu Balan, Saratoga, CA (US); Arif Al Amin, Fremont, CA (US); Sanjeev Maheshwari, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,675

(22) Filed: Jan. 5, 2016

(65) Prior Publication Data

US 2016/0226684 A1    Aug. 4, 2016

Related U.S. Application Data

(63) Continuation of application No. 13/727,442, filed on Dec. 26, 2012, now Pat. No. 9,231,802.

(51) Int. Cl.
| | |
|---|---|
| *H03H 7/30* | (2006.01) |
| *H03H 7/40* | (2006.01) |
| *H03K 5/159* | (2006.01) |
| *H04L 27/01* | (2006.01) |
| *H04L 25/03* | (2006.01) |
| *H04L 7/033* | (2006.01) |

(52) U.S. Cl.
CPC .............. *H04L 27/01* (2013.01); *H04L 7/033* (2013.01); *H04L 7/0332* (2013.01); *H04L 25/03057* (2013.01); *H04L 25/03248* (2013.01); *H04L 25/03878* (2013.01)

(58) Field of Classification Search
CPC ... H04L 27/01; H04L 7/033; H04L 25/03248; H04L 25/03057; H04L 7/0332; H04L 25/03878
See application file for complete search history.

(56) References Cited

U.S. PATENT DOCUMENTS

| | | | |
|---|---|---|---|
| 5,436,937 A | 7/1995 | Brown et al. | |
| 6,400,291 B1 | 6/2002 | Sankey | |
| 8,259,890 B2 | 9/2012 | Chenk et al. | |
| 8,681,839 B2 * | 3/2014 | Bulzacchelli | H04L 25/14 375/220 |

(Continued)

FOREIGN PATENT DOCUMENTS

| | | |
|---|---|---|
| CN | 101595699 | 12/2009 |
| TW | 201228304 | 7/2012 |

*Primary Examiner* — Erin File

(57) ABSTRACT

An apparatus including a receiver coupled to receive an input signal from a communication link and operable to employ decision feedback equalization to the input signal of the communication link and generate an edge sample signal. The apparatus also includes a timing recovery module coupled to the receiver and operable to receive the edge sample signal and use the edge sample signal to generate a data sampling phase signal, wherein the edge sample signal influences a settling point of the data sampling phase signal.

19 Claims, 7 Drawing Sheets

(56) References Cited

U.S. PATENT DOCUMENTS

| | | |
|---|---|---|
| 8,791,735 B1 | 7/2014 | Shibasaki |
| 9,184,907 B2 | 11/2015 | Mills et al. |
| 9,231,802 B2 | 1/2016 | Zhong et al. |
| 2004/0091064 A1 | 5/2004 | Cao et al. |
| 2004/0091073 A1 | 5/2004 | Smith et al. |
| 2004/0202266 A1* | 10/2004 | Gregorius ............... H03L 7/07 |
| | | 375/355 |
| 2005/0180536 A1 | 8/2005 | Payne et al. |
| 2006/0114069 A1 | 6/2006 | Kojima et al. |
| 2006/0158262 A1 | 7/2006 | Robinson et al. |
| 2008/0056344 A1* | 3/2008 | Hidaka ............ H04L 25/03885 |
| | | 375/232 |
| 2009/0296867 A1 | 12/2009 | Do et al. |
| 2010/0103999 A1 | 4/2010 | Leibowitz et al. |
| 2011/0243215 A1 | 10/2011 | Wu et al. |
| 2012/0033773 A1 | 2/2012 | Nedovic |
| 2012/0106539 A1 | 5/2012 | Ferraiolo et al. |
| 2012/0106687 A1* | 5/2012 | Bulzacchelli ........... H04L 25/14 |
| | | 375/354 |
| 2012/0128055 A1 | 5/2012 | Jiang |
| 2012/0151247 A1 | 6/2012 | Ferraiolo et al. |
| 2012/0250811 A1 | 10/2012 | Misek et al. |
| 2013/0070882 A1 | 3/2013 | Nedovic |
| 2013/0154698 A1 | 6/2013 | Bottelli et al. |
| 2013/0249612 A1* | 9/2013 | Zerbe ................... H04L 7/0079 |
| | | 327/161 |
| 2014/0016692 A1* | 1/2014 | Leibowitz ......... H04L 25/03057 |
| | | 375/233 |
| 2014/0177693 A1 | 6/2014 | Zhong et al. |
| 2014/0185633 A1 | 7/2014 | Mills et al. |
| 2015/0010047 A1 | 1/2015 | Zhong et al. |

\* cited by examiner

| $x_k$ | $d_{k-1}$ | $d_k$ | Delta Phase | $x_k \cdot d_{k-1}$ |
|---|---|---|---|---|
| -1 | -1 | 1 | -1 | -1 |
| -1 | -1 | 1 | 1 | 1 |
| -1 | 1 | -1 | -1 | -1 |
| 1 | 1 | -1 | 0 | -1 |
| -1 | -1 | 1 | -1 | -1 |
| -1 | -1 | -1 | -1 | -1 |
| -1 | -1 | -1 | 0 | 1 |

INFLUENCE CLOCK DATA RECOVERY SETTLING POINT BY APPLYING DECISION FEEDBACK EQUALIZATION TO A CROSSING SAMPLE

CROSS-REFERENCE TO RELATED APPLICATIONS

This application is a continuation of and claims priority to and the benefit of patent application Ser. No. 13/727,442, filed on Dec. 26, 2012, which is herein incorporated by reference in its entirety.

This application is related to patent applications: "ADAPTATION OF CROSSING DFE TAP WEIGHT," concurrently filed with this application, with Ser. No. 13/935,391, which is herein incorporated by reference in their entirety.

BACKGROUND OF THE INVENTION

Often times high-speed serial data streams are sent without an accompanying clock signal. Clock and data recovery (CDR) methods allow for a receiver to generate a clock from an approximate frequency reference. As input/output speeds become higher, the data sampling point used by CDR becomes increasingly critical to the link performance. The sampling point is typically determined by bang-bang CDR, where the settling point may not be where the vertical eye opening is largest or at the middle of the eye. As a result, the sampling point may not be optimal and signal integrity issues may arise.

BRIEF SUMMARY OF THE INVENTION

Accordingly, a need exists for an apparatus and method for to manipulate the CDR settling point in an effort to achieve an optimum sampling phase. Embodiments of the present invention disclose an apparatus and method for influencing a clock and data recovery settling point (CDR settling point) of a data sampling point signal by applying decision feedback equalization (DFE) on an input signal to produce a DFE output signal which is fed to a sampler which is clocked by the edge sample recovery clock. The sampler produces an edge sample signal. The edge sample signal is then used to influence the CDR settling point of a data sampling point signal.

More specifically, embodiments of the present invention are directed toward an apparatus comprising: a first module coupled to an input signal and operable to generate an edge signal using a first clock signal; and a second module operable to receive said edge signal and further operable to generate a data sampling phase signal, wherein said edge signal influences a settling point of said data sampling phase signal.

Embodiments include the above and further comprise: a third module operable to generate a data sample signal using a second clock signal; and a fourth module operable to generate an error sample signal using a third clock signal and wherein said first module is a decision feedback equalizer.

Embodiments include the above and wherein said first module further comprises: a first path coupled to said input signal, said first path comprising: a first preamplifier; a first summing node coupled to said first preamplifier; and a first latch coupled to said first summing node and said first clock signal; a second path coupled to said input signal, said second path comprises: a second preamplifier; a summing node coupled to said second preamplifier and operable to apply feedback to its input signal based on a previously generated data sample; and a second latch coupled to said second summing node; and a multiplexer coupled to said first latch and said second latch, said multiplexer operable to select an output between said first latch and said second latch based on an exclusive OR of a first and a second previously generated data samples.

Embodiments include the above and wherein said first module further comprises: a first path coupled to said input signal, said first path comprising: a first preamplifier; a first summing node coupled to said first preamplifier and operable to apply a first feedback to its input signal based on a previously generated data sample; and a first latch coupled to said first summing node; a second path coupled to said input signal, said second path comprising: a second preamplifier; a second summing node coupled to said second preamplifier and operable to apply a second feedback to its input signal based on a previously generated data sample; and a second latch coupled to said second summing node; and a multiplexer coupled to said first latch and said second latch, said multiplexer operable to select an output between said first latch and said second latch based on an exclusive OR of a first and a second previously generated data samples.

Embodiments include the above and wherein said first module further comprises: a first path coupled to said input signal, said first path comprising: a first preamplifier operable to offset said input signal by a first predefined constant value; a first summing node coupled to said first preamplifier; and a first latch coupled to said summing node; a second path coupled to said input signal, said second path comprising: a second preamplifier operable to offset said input signal by a second predefined constant value; a second summing node coupled to said second preamplifier; a second latch coupled to said second summing node; and a multiplexer coupled to said first latch and said second latch, said multiplexer operable to select between an output of said first latch and said second latch based on a previously generated data sample.

Embodiments include the above and wherein said second module comprises: a phase detector operable to receive said edge sample signal and generate a plurality of delta phases therefrom; a loop filter coupled to said phase detector operable to average said plurality of delta phases and generate a phase code; and a phase interpolator coupled to said loop filter operable to generate said data sampling phase based upon said phase code.

The invention also includes a receiver embodiment, the receiver includes a first module coupled to receive an input signal and operable to employ Decision Feedback Equalization to an input signal and generate an edge sample signal. The receiver also includes a timing recovery module coupled to the first module and operable to receive the edge signal and generate a data sampling phase signal, wherein the edge signal influences a settling point of the data sampling phase signal.

In another embodiment, the present invention is drawn towards a method. The method comprising: receiving an input signal at an input of a receiver; applying decision feedback equalization (DFE) to said input signal based on prior recovered data values to generate an output DFE signal; using a sample module clocked by an X clock signal, sampling said output DFE signal to generate an edge sample signal; and using said edge sample signal to influence a settling point of a data sampling signal.

BRIEF DESCRIPTION OF THE DRAWINGS

The embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
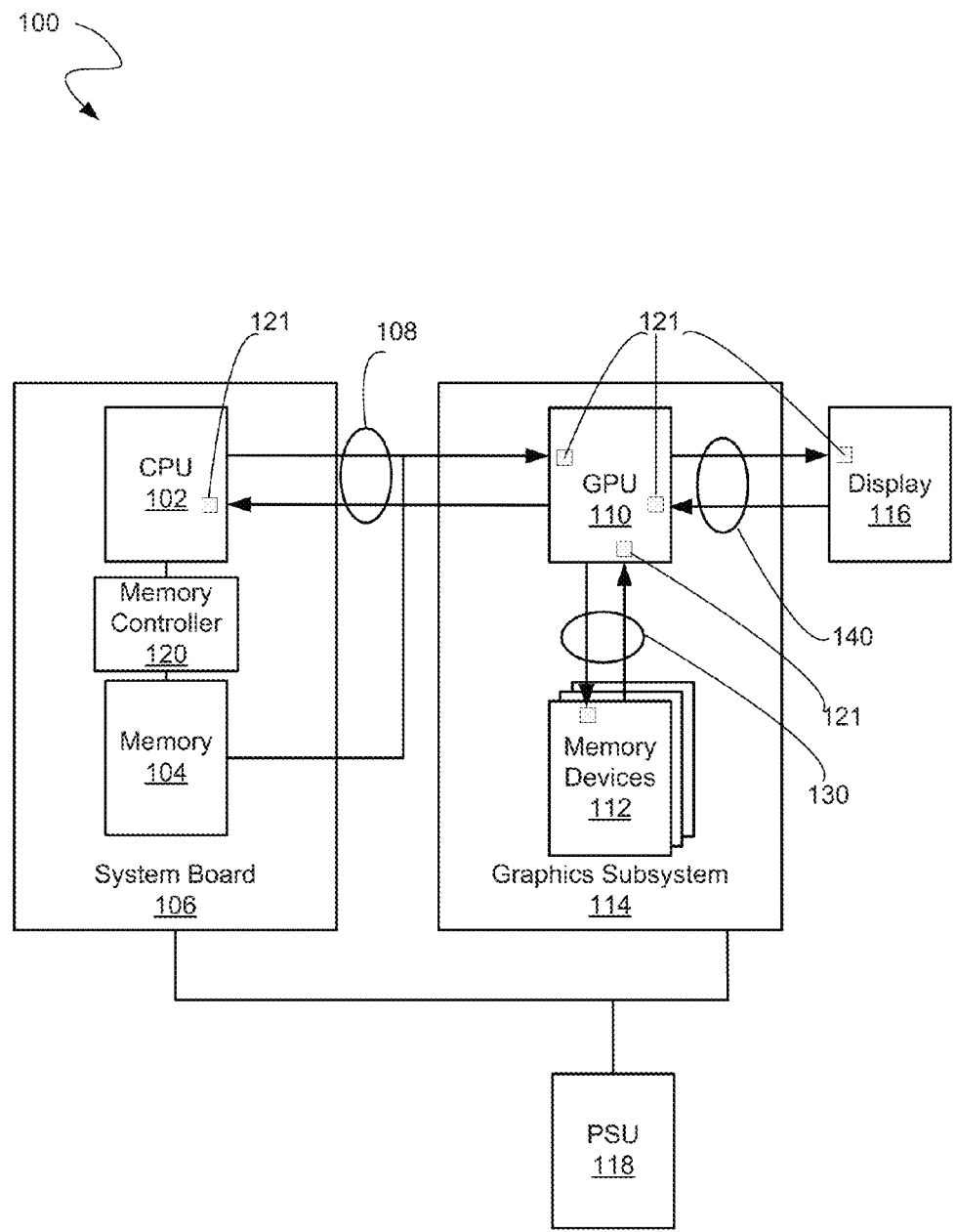
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software-based functionality, in particular, computer graphics rendering and display capability. In general, computer system 100 comprises a system board 106 including at least one central processing unit (CPU) 102 and a system memory 104. The CPU 102 can be coupled to the system memory 104 via a memory controller 120. In an embodiment, system memory 104 may be DDR3 SDRAM.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented and other types of processors (e.g., general purpose or other special-purpose coprocessors) or within a CPU.

System board 106 also includes a receiver device 121, in accordance with embodiments of the present invention, which may be placed on any communication link at the receiver end. As shown, receivers 121 are placed on the receiver ends of bidirectional communication link 108 (between CPU 102 and GPU 110) and communication link 130 (between GPU 110 and memory) and communication link 140 (between GPU 110 and the display). It is appreciated that these communication links are exemplary. Communication device 121 is operable to receive data (See FIG. 2). The receiver may be either local or remote to system 100.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Figure 2:
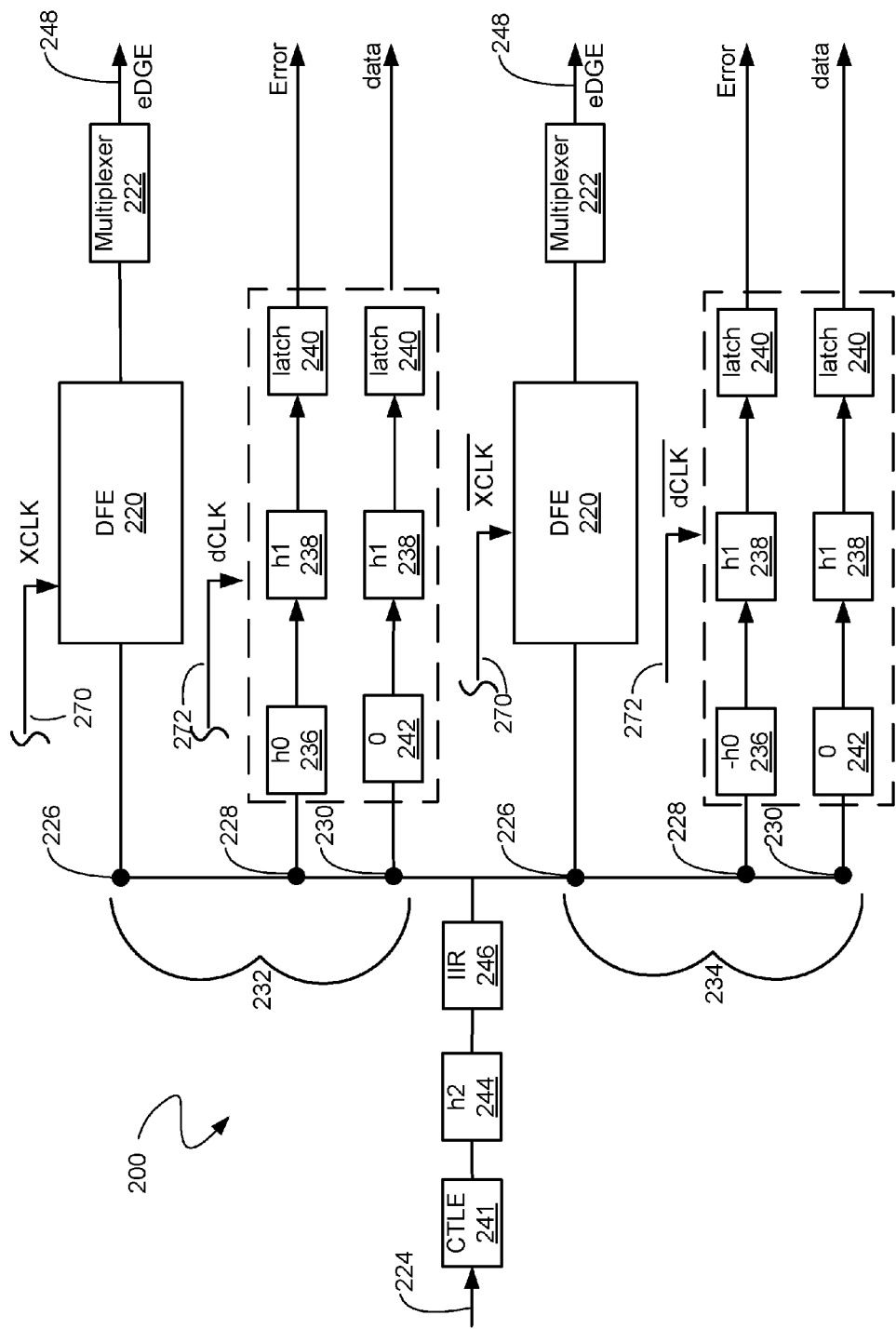
FIG. 2 shows an exemplary receiver, in accordance with one embodiment of the present invention in applying DFE techniques to an input signal to recover an edge sample signal.

Influence Clock Data Recovery Settling Point by Applying Decision Feedback Equalization to a Crossing Sample FIG. 2 shows an exemplary communication receiver 200, in accordance with one embodiment of the present invention. Receiver 200 is operable to receive an input signal 224.

Typically, input signal 224 may be generated and transmitted via a transmitter (not shown). The transmitter may be remote or local.

Receiver 200 comprises a first circuit branch 226, second circuit branch 228, and a third circuit branch 230. Branch 226 is clocked by an x_clock signal 270. The x_clock signal 270 is the signal used to recover the edge sample signal 248. Branches 228 and 230 are clocked by the d_clock signal 272 which is used to recover the data sample signal and the error sample signal. In an embodiment, receiver 200 may comprise an odd path 232 and an even path 234, wherein both odd path 232 and even path 234 each comprise first circuit branch 226, second circuit branch 228 and third circuit branch 230. Both odd path 232 and even path 234 may simultaneously process a signal while odd path 232 operates on data of a first clock cycle and even path 234 operates on data of a second clock cycle. It is appreciated that the odd path is clocked by complement clocks, e.g., x_clock (bar) and d_clock (bar).

It is appreciated that first circuit branch 226 comprises a decision feedback equalization (DFE) block 220 coupled to a multiplexer 222. DFE block 220 is operable to apply DFE techniques to an input signal 224. Upon applying DFE to input signal 224, a DFE output is generated which is then sampled according to a sampler clocked by the x_clock 270. The result of this signal is then multiplexed via multiplexer 222 to produce an edge sample signal 248. Multiplexer 222 selects a single signal out of two or more outputs of DFE block 220. Branch 228 and 230 may also employ DFE techniques, e.g., h1 blocks.

Figure 4:
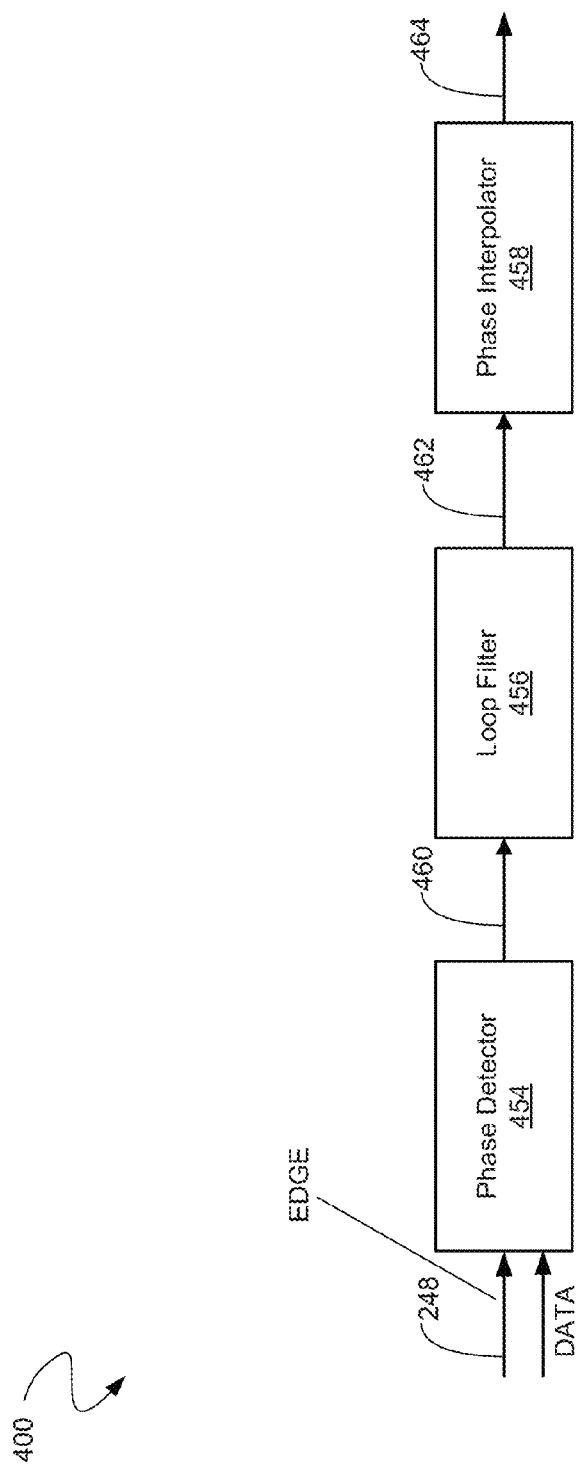
FIG. 4 shows an exemplary timing recovery module, in accordance with one embodiment of the present invention.

The edge sample signal 248 is then transmitted to and used by a timing recovery module (See FIG. 4). The generated edge sample signal is then used to influence a clock and data recovery (CDR) settling point, described further below.

Second circuit branch 228, receives the d_clock 272 and comprises an h0 constant block 236, an h1 feedback block 238 (based on a prior received data bit), and a latch 240. Second circuit branch 228 is operable to generate an error sample signal based on the input signal 224. In an embodiment, h0 constant block 236 is subtracted from its incoming signal.

Third circuit branch 230, receives the d_clock 272 and comprises a buffer 242, h1 feedback block 238 (based on a prior received data bit), and a latch 240. Third circuit branch 230 is operable to generate a data sample signal based on the input signal 224.

In an embodiment, receiver 200 may also comprise a continuous time linear equalizer (CTLE) 241, h2 feedback 244, and an infinite impulse response (IIR) filter 246. CTLE 241, h2 244, and IRR 246 may be applied to input signal 224 prior to splitting input signal 224 into first circuit branch 226, second circuit branch 228, and third circuit branch 230. CTLE 241 is configured to shape an input pulse response to compensate for feedback from the DFE.

Figures 3A, 3B, 3C:
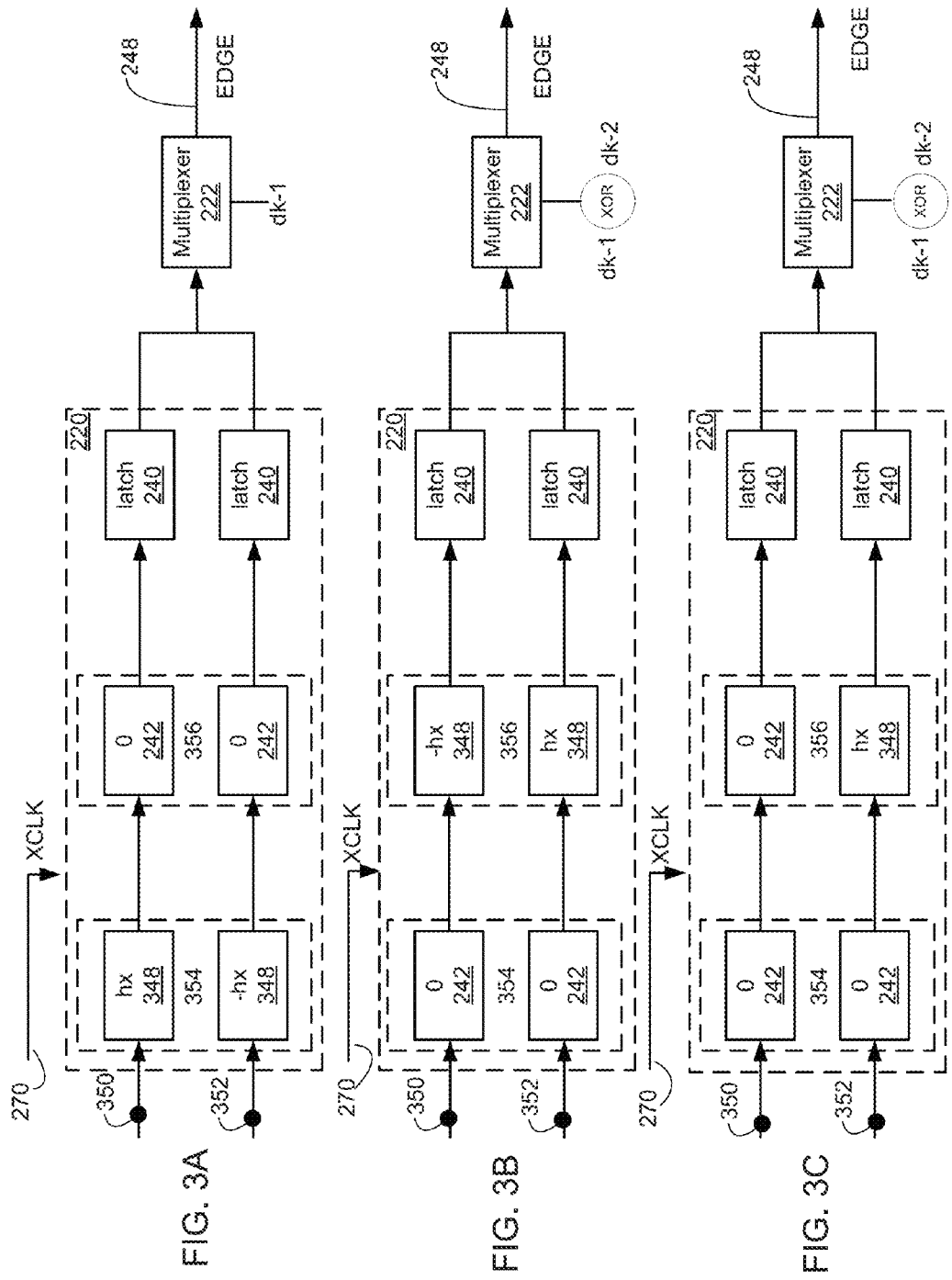
FIG. 3A shows an exemplary DFE block comprising constant offset blocks, buffers, and latches, in accordance with one embodiment of the present invention.
FIG. 3B shows an exemplary DFE block comprising a constant offset block, a feedback block, and a latch, in accordance with one embodiment of the present invention.
FIG. 3C shows an exemplary DFE block comprising a constant offset block, a feedback block, and a latch, in accordance with one embodiment of the present invention.

FIG. 3A shows an exemplary DFE block 220, which receives the x_clock 270, and comprises constant hx offset blocks 348, buffers 242, and latches 240, in accordance with one embodiment of the present invention. FIG. 3A is depicted as a shorthand block diagram of expressing the processing on the input signal to arrive at the edge sample signal 248. DFE block 220 applies DFE techniques to input signal 224 (FIG. 2). DFE block 220 comprises a first path 350 and a second path 352.

DFE block 220 offsets the input signal during a constant column 354 and applies feedback to the input signal during a feedback column 356.

First path 350 and second path 352 receive the input signal. In the constant column 354, first path 350 applies a +hx constant offset 348 (subtraction) to reduce the input signal, operable to offset (reduce) the input signal by a predetermined constant value. The input signal may be offset by a positive constant value or a negative constant value. In this case, hx may be 5 mV and the processed input signal may be offset (reduced) by 5 mV. In the constant column 354, second path 352 applies a −hx constant offset 348 to the input signal, operable to offset (reduce) the input signal by a predetermined value. In this case, reduction by a negative acts to add to the signal. In this case, hx may be −5 mV and the input signal may be offset (reduced) by −5 mV thereby adding 5 mV.

During the feedback column 356, neither first path 350 nor second path 352 apply any feedback to the signal. Rather, buffer 242 delays or buffer the signal for a predetermined amount of time.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to one if a prior data value (dk−1) is equal to 1. In this case, first path 350 will be selected by the multiplexer 222 and will be output as the edge signal 248. Otherwise, if a prior data value (dk−1) is not equal to 1, second path 352 will be selected by the multiplexer 222 and will be output as the edge signal 248.

FIG. 3B shows an exemplary DFE block 220, receiving the x_clock signal 270, and comprising constant hx feedbacks 348, buffers 242, and latches 240, in accordance with one embodiment of the present invention. FIG. 3B is depicted as a shorthand method of expressing the processing on the input signal. DFE block 220 applies DFE techniques to input signal 224 (FIG. 2). DFE block 220 comprises a first path 350 and a second path 352.

DFE block 220 offsets the signal during a constant column 354 and applies feedback to the signal during a feedback column 356.

First path 350 and second path 352 receive the input signal. During the constant column 354, neither first path 350 nor second path 352 apply any constant offset to the signal. Rather, buffers 242 stall the signal for a predetermined amount of time.

During the feedback column 356, first path 350 applies (subtraction) a −hx feedback 348 (based on a prior received data bit) to the signal, thereby applying DFE techniques to the signal. Second path 352 applies (subtracts) a hx feedback 348 to the signal. Both −hx and hx feedback 348 are feedback based on a prior data value.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to the result of an exclusive OR operation with a first and a second prior data values. In this case, first path 350 will be selected by the multiplexer 222 and will be output as the edge signal 248 if the result of the exclusive OR operation is 1. Otherwise, if the result of the exclusive OR operation is zero, second path 352 will be selected by the multiplexer 222 and will be output as the edge signal 248.

FIG. 3C shows an exemplary DFE block 220, receiving the x_clock signal 270 and comprising a buffer 242, hx feedback 348, and latches 240, in accordance with one embodiment of the present invention. FIG. 3B is depicted as a shorthand method of expressing the processing on the input signal. DFE block 220 applies DFE techniques to input signal 224 (FIG. 2). DFE block 220 comprises a first path 350 and a second path 352.

DFE block 220 offsets the signal during a constant column 354 and applies feedback to the input signal during a feedback column 356.

First path 350 and second path 352 receive the signal. During the constant column 354, neither first path 350 nor second path 352 apply any constant offset to the signal. Rather, buffers 242 delay the signal for a predetermined amount of time.

During the feedback column 354, first path 350 uses buffer 242 to stall the signal, thereby applying no feedback to the signal. Second path 352 applies (subtracts) a hx feedback 348 to the signal, thereby applying DFE techniques to the signal. hx feedback 348 is feedback based on a prior data value.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to the result of an exclusive OR operation with a first and a second prior data values. In this case, first path 350 will be selected by the multiplexer 222 and will be output as the edge signal 248 if the result of the exclusive OR operation is 1. Otherwise, if the result of the exclusive OR operation is zero, second path 352 will be selected by the multiplexer 222 and will be output as the edge signal 248.

FIG. 3A, FIG. 3B, and FIG. 3C demonstrate three exemplary embodiments of DFE block 220 in accordance with the present invention. Typical latch 240 input is:

$$r(t) = \sum_{i=-\infty}^{\infty} (d_i \cdot g(t - i \cdot T) \otimes h(t)) = \sum_{i=-\infty}^{\infty} (d_i \cdot p(t - i \cdot T))$$

Where p(t) is the equalized pulse response at the latch input. It includes the circuit branch and the equalizers at both a transmitter and the receiver 200 (CTLE, DFE, IIR, etc.).

The latch 240 samples are obtained by sampling latch 240 input at a data or crossing sampling phase:

$$r_{k-\delta} = r(t)|_{t=(k-\delta)\cdot T - \tau_k} = \sum_{i=-\infty}^{\infty} (d_i \cdot p((k - \delta - i) \cdot T - \tau_k)) = \qquad (3)$$

$$\sum_{i=-\infty}^{\infty} (d_i \cdot P_{k-\delta-i}^k) = \sum_{j=-\infty}^{\infty} (d_{k-j} \cdot P_{j-\delta}^k) = \sum_{j=-\infty}^{\infty} (d_{k-j} \cdot p_{j-\delta})$$

Here $\tau_k$ is the data sampling phase at the kth symbol, $\delta$ is the IQ offset (in the unit of UI). For data samples, $\delta=0$. When the CDR changes the data sampling $\tau_k$, the samples of pulse response $P_{j-\delta}^k$ change with it. When the CDR moves left, $p_1$ increases and $p_{-1}$ decreases even for the same latch.

When the CDR moves left, $p_1$ increases and $p_{-1}$ decreases even for the same latch.

The closed form expression of the latch sample derived is the foundation of the analysis of the CDR settling point. It also the basis of the equalizer design.

Taking DFE as an example (data equalization), without DFE the data latch sample can be obtained by equation (3) by setting $\delta=0$.

$$r_k = \sum_{j=-\infty}^{\infty} d_{k-j} \cdot p_j$$

From the expression it is clear that there exists inter-symbol interference (ISI) from the data symbols both in the past and the future. By using DFE with N taps (data equalization), one can reduce the ISI in the data latch sample. When $h_j = p_j$, the residual ISI from the corresponding data symbol can be eliminated. Here, $p_j$ is the pulse response sample at the DFE input.

$$r_k - \sum_{i=1}^{N} (h_i \cdot d_{k-i}) =$$

$$\sum_{j=-\infty}^{-1} d_{k-j} \cdot p_j + p_0 \cdot d_k + \sum_{j=1}^{N} (p_j - h_j) \cdot d_{k-j} + \sum_{j=N+1}^{\infty} d_{k-j} \cdot p_j$$

For crossing latch samples, there also exists ISI from the data symbols both in the past and in the future. This is apparent from the equation above. One should note that the interferences are from the data symbols, not from other crossing latch outputs. The pulse response samples $p_{j-\delta}$ will be obtained at the sampling points of the cross latch, rather than that of the data latch. For example, if $\delta=0.4$ the crossing ISI is $$r_{k-0.4} = \ldots + p_{-0.4} \cdot d_k + p_{0.6} \cdot d_{k-1} + p_{1.6} \cdot d_{k-2} + \ldots$$

However, reducing the crossing ISI does not have direct impact on the data latch output or even the zero crossings of the data latch input eye. Hence what matters to the data latch is how the CDR settling point is impacted by the ISI in the crossing latch samples.

FIG. 4 shows an exemplary timing recovery module 400, in accordance with one embodiment of the present invention. Timing recovery module 400 is coupled to receiver 200 (FIG. 2) and receives edge sample signal 248 from receiver 200 (FIG. 2) and also receives the data sample signal. Timing recovery module 400 includes phase detector 454, loop filter 456, and phase interpolator 458.

Phase detector 454 receives edge sample signal 248 and data signals from receiver 200 (FIG. 2). Data signals include a current data value and a prior data value. Phase detector 454 is operable to generate a plurality of delta phases 460 based on the received edge signal 248, a current data value, and a prior data value.

Loop filter 456 is coupled to phase detector 454. Loop filter 456 receives the delta phases 460 generated by phase detector 454 and averages the delta phases 460 to generate a phase code 462. Loop filter 456 inherently functions as an adder, accumulator, and loop gain control.

Phase interpolator 458 is coupled to loop filter 456 and receives the phase code 462 generated by loop filter 456. Phase interpolator 458 interpolates the phase code 462 based upon values contained within a lookup table and generates a data sampling phase 464 therefrom. Interpolation or lookup table processing may be used interchangeably. Data sampling phase 464 settles at a point to become the clock and data recovery settling point (CRD settling point). Thus, effectively, the edge sample signal influences the clock and data recovery settling point of the data sampling phase 464 in accordance with embodiments of the present invention.

Bang-bang CDR adjusts the phase based on the triplet $(d_k, x_k, d_{k-1})$ where $x_k$ is the crossing latch output with a sampling phase between that of $d_{k-1}$ and $d_k$. From the truth table (See FIG. 5), it is appreciated that bang-bang CDR is equivalent to the sign-sign version of a one-tap edge equalizer. It follows that what bang-bang CDR attempts to do is to adjust the sampling phase such that the term related to $d_{k-1}$ (the first crossing ISI tap) is minimized.

Figure 5:
FIG. 5 shows a truth table used by a phase detector, in accordance with one embodiment of the present invention.

FIG. 5 shows a truth table 500 used by a phase detector 454 (FIG. 4), in accordance with one embodiment of the present invention. Truth table 500 is used by phase detector 454 (FIG. 4) in determining the delta phases as a function of the edge signal 248 (FIG. 2), a current data value ($d_k$), and a prior data value ($d_{k-1}$). Truth table 500 may be stored within memory 104 (FIG. 1) of system 100 (FIG. 1).

Timing recovery module 400 demonstrates a typical CDR loop. A first order CDR loop filter consists of two stages. The first stage of the loop filter provides a constant divide ratio or proportional gain μ. The divide ratio is large enough (or μ is small enough) that $(\Sigma\mu \cdot x_k \cdot d_{k-1}) \sim E[x_k \cdot d_{k-1}]$. The accumulation in the formula is achieved by the phase integrator in the $2^{nd}$ stage of the loop filter, which increments or decrements the phase code by 1 (or a fixed step size) or decrements it by 1 based on the output of the first stage.

To facilitate the analysis of the CDR settling point, the phase detector is replaced with equivalent gradient $x_k \cdot d_{k-1}$. When the long term average of $x_k \cdot d_{k-1}$ is 0, the phase code will not change or simply dither between two adjacent values. Consequently, the CDR phase settles to where the long term average of $x_k \cdot d_{k-1}$ is 0.

Building on equation (3) and the relationship between CDR and equalizer, we can derive a closed-form expression for the CDR settling point. It follows from equation (3) that when there is a transition between the current data symbol and the previous one, $$r_{k-\delta} \cdot d_{k-1}|_{d_k=-d_{k-1}} = \sum_{j=-\infty}^{\infty}(d_{k-j}, p_{j-\delta}), d_{k-1}|_{d_k=-d_{k-1}} =$$

$$(p_{1-\delta} - p_{-\delta}) \cdot d_{k-1}^2 + \sum_{j=-\infty, j\neq 0,1}^{\infty}(p_{j-\delta}, d_{k-j}, d_{k-1}) = p_{1-\delta} - p_{-\delta} + \Delta$$

where $r_{k-\delta}$ is the crossing latch sample and $$\Delta = \sum_{j=-\infty, j\neq 0,1}^{\infty}(p_{j-\delta} \cdot d_{k-j} \cdot d_{k-1}).$$

If the data symbols are independent and identically distributed, the long term average of $r_{k-\delta} \cdot d_{k-1}$ is $p_{1-\delta} - p_{-\delta}$. In addition, $r_{k-\delta} \cdot d_{k-1}$ is symmetric around it, with equal number of values above and below it.

If the crossing latch threshold is 0, the latch output $x_k \cdot d_{k-1} = \text{sgn}(r_{k-\delta}) \cdot d_{k-1} = \text{sgn}(r_{k-\delta} \cdot d_{k-1})$.

The long term average of $x_k \cdot d_{k-1}$ is zero if and only if there are equal number of $r_{k-\delta} \cdot d_{k-1}$ above and below 0. When $p_{-\delta} = p_{1-\delta}$, this is true. However, even if $p_{-\delta} \neq p_{1-\delta}$, as long as the two $r_{k-\delta} \cdot d_{k-1}$ values closest to $p_{1-\delta} - p_{-\delta}$ have different polarities, there will still be equal number of $r_{k-\delta} \cdot d_{k-1}$ above and below 0. As a result, bang-bang CDR will settle to a zone centered at $p_{-\delta} = p_{1-\delta}$.

One should note that $p_{-\delta}$ is the sample of the pulse response seen by the crossing latch, not that seen by a data latch if they are different. For baud-rate CDR, using equation (3) and going through a similar analysis, we can express its settling point as $p_{-1} = p_1$.

Once the closed-form expression of the CDR settling point is known, e.g., $p_{-\delta} = p_{1-\delta}$, it is apparent what can be done to influence its settling point. If the IQ offset δ is changed, the CDR settling point will change as a result.

Figure 6:
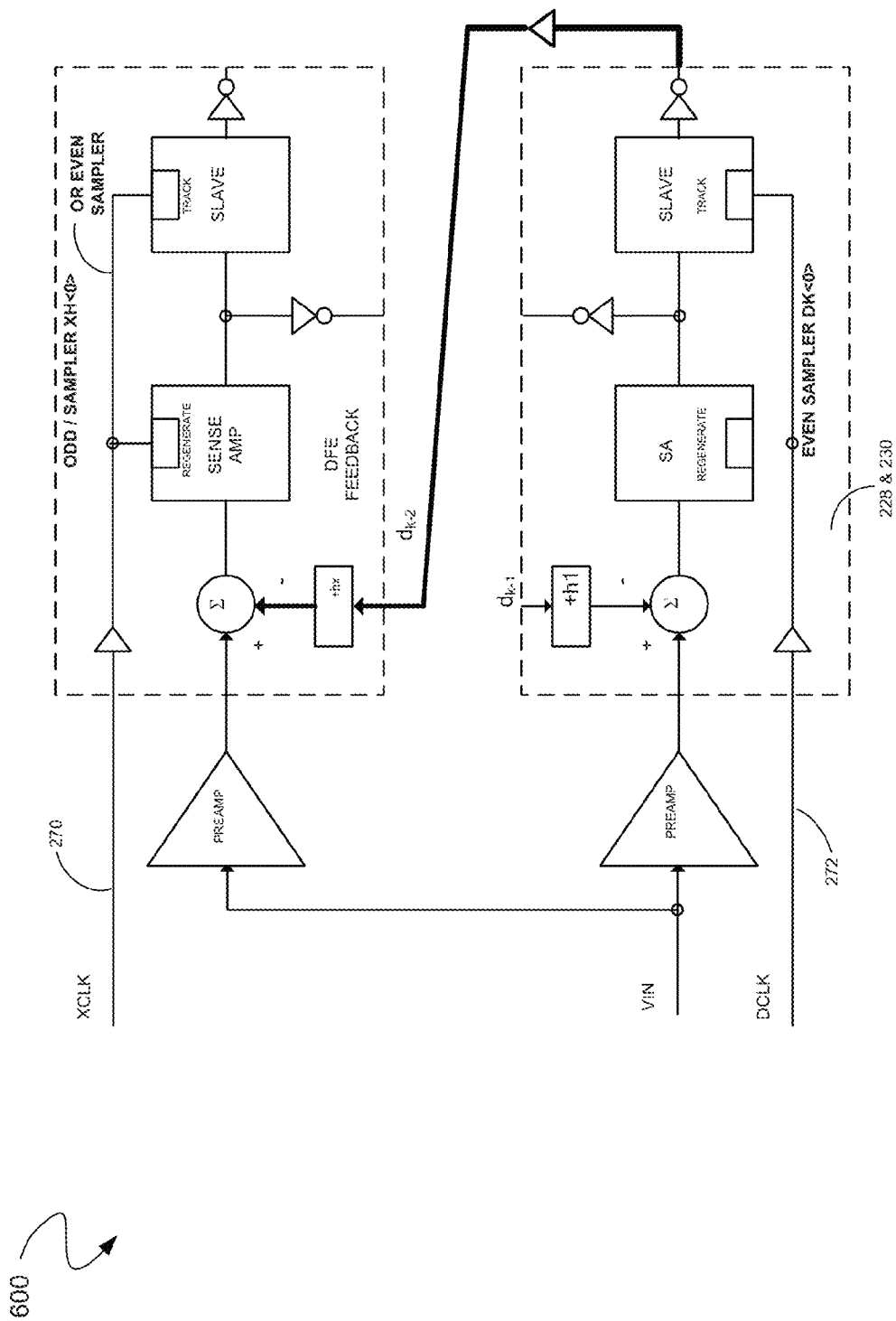
FIG. 6 shows an exemplary circuit employing DFE, in accordance with one embodiment of the present invention, to recover an edge sample signal.

FIG. 6 shows an exemplary circuit 600 employing DFE, in accordance with one embodiment of the present invention on the input signal to arrive at an edge sample signal. Circuit 600 demonstrates an embodiment of implementing the present invention. Circuit 600 includes an odd sampler and an even sampler circuits.

Odd sampler circuit corresponds to circuit 220 of FIG. 2. It receives the X_clock signal 270 and applies DFE techniques to the input signal which is passed through a preamplifier. The output of the DFE is then passed to a sense amplifier circuit which is clocked by the X_clock signal 270. The output of the ODD sampler circuit is then the edge sample circuit. It is appreciated that Odd sampler circuit could also be replaced with an even sampler circuit in this embodiment. In this embodiment, both circuits of FIG. 6 would be even.

The Even Sampler circuit of the lower portion of FIG. 6 corresponds to branches 228 and 230 of FIG. 2 and receives the d_clock signal 272 and produces the error and data sample signals as described above.

More specifically, the even data sampler receives a feedback from a prior data value ($d_{k-1}$) and offsets it by a constant $+h1.d_{k-1}$. It is then summed with Vin from a preamp circuit and propagated through the rest of the circuit. Similarly, the even data sampler transmits a feedback from a prior data value ($d_{k-2}$) to the even edge sampler. The feedback is used to create an offset by an amount $+hx.d_{k-2}$ and summed with Vin from a preamp circuit. The even data sampler receives DCLK 272 and the even edge sampler receives XCLK 270. This embodiment is specific to half-rate Rx implementations however the invention could equally be used in full-rate Rx designs.

Figure 7:
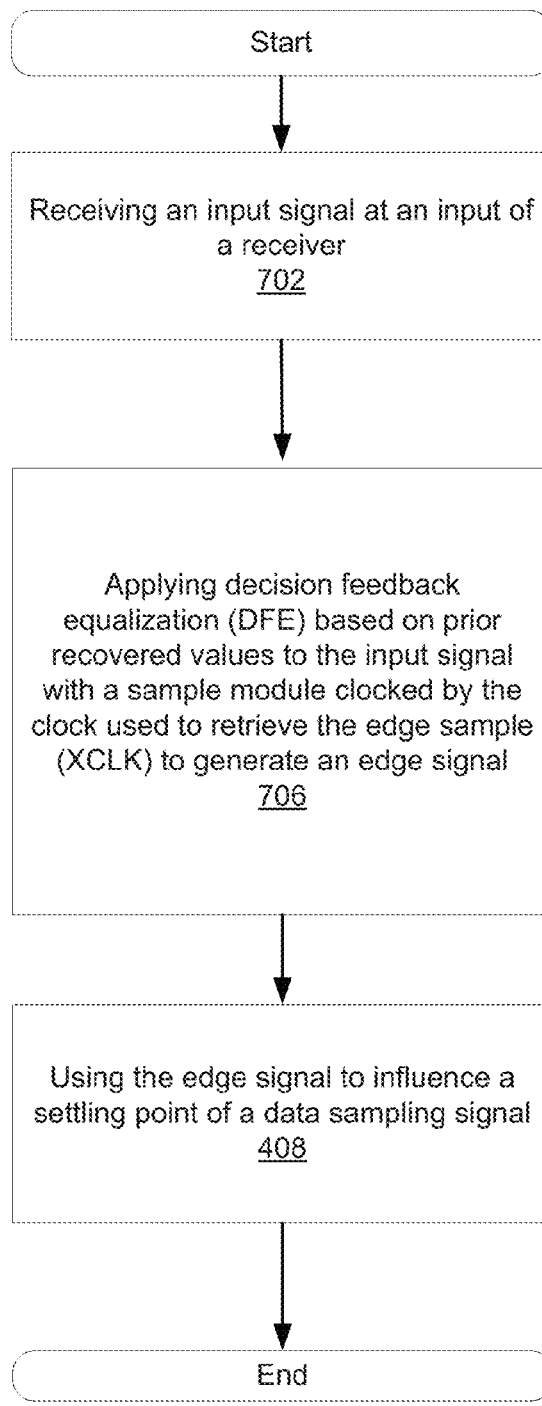
FIG. 7 shows a flowchart of an exemplary computer controlled process employed by a receiver to apply DFE techniques to an input signal for recovery of an edge sample signal that will be used to influence a CDR settling point.

FIG. 7 shows a flowchart of an exemplary receiver implemented process of influencing a CDR settling point by applying DFE techniques to an input signal which produces and edge sample signal, in accordance with one embodiment of the present invention. In block 702, an input signal is received at an input of a receiver. For example, in FIG. 2, the input signal is received at the input of the receiver. Subsequently, CTLE, h2 feedback, and a IIR filter are applied to the signal prior to splitting the signal into a first circuit branch, second circuit branch, and third circuit branch.

In block 706, decision feedback equalization (DFE) is applied to the input signal based on prior recovered data values to generate an output DFE signal. This output DFE signal is then fed to a sampler that is clocked by the x_clock to produce an edge sample signal. For example, in FIG. 2, and in FIG. 6 the DFE circuit blocks apply DFE techniques to the input signal to recover the edge sample signal. The multiplexer selects one out of a plurality of outputs from the DFE block based on a logic function, the output of which is the edge sample signal.

In block 708, the edge sample signal is used to influence a settling point of a data sampling signal. For example, in FIG. 4, the edge sample signal is received by the timing recovery module. The timing recovery module uses a phase detector to generate delta phases based on the edge signal, a current data value, and a prior data value. The loop filter then averages the delta phases to generate a phase code. The phase interpolator uses the phase code and a look-up table to interpolate the phase code and generate a data sampling phase. The data sampling phase eventually settles into a clock and data recovery settling point. Thus, the DFE techniques used to produce the edge sample signal influence the clock and data recovery settling point of the receiver.

In an embodiment, the receiver may also comprise a continuous time linear equalizer (CTLE) is configured to shape an input pulse response to compensate for feedback from the DFE.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

In an embodiment, the zero crossing signal may be offset by a predetermined constant.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus, comprising:
   a first module coupled to an input and comprising:
   a first branch coupled to said input that generates an edge signal, wherein the first branch comprises a decision feedback equalization (DFE) block that applies DFE to an input signal received from said input to generate a DFE output that is sampled using a first clock signal;
   a second branch coupled to said input that generates an error signal in parallel with said first branch and is clocked with a second clock signal; and
   a third branch coupled to said input that generates a data signal in parallel with said second branch and is clocked with said second clock signal; and
   a second module that receives said edge signal and generates a data sampling phase signal, wherein said edge signal influences a settling point of said data sampling phase signal.

2. The apparatus of claim 1, wherein said DFE block comprises:
   a first path coupled to said input signal, said first path comprising:
   a first preamplifier;
   a first summing node coupled to said first preamplifier; and
   a first latch coupled to said first summing node and said first clock signal;
   a second path coupled to said input signal, said second path comprising:
   a second preamplifier;
   a summing node coupled to said second preamplifier and operable to apply feedback to its input signal based on a previously generated data sample; and
   a second latch coupled to said second summing node; and
   a multiplexer coupled to said first latch and said second latch, said multiplexer operable to select an output between an output of said first latch and an output of said second latch based on an exclusive OR of a first and a second previously generated data samples.

3. The apparatus of claim 1, wherein said DFE block comprises:
   a first path coupled to said input signal, said first path comprising:
   a first preamplifier;
   a first summing node coupled to said first preamplifier and operable to apply a first feedback to its input signal based on a previously generated data sample; and
   a first latch coupled to said first summing node;
   a second path coupled to said input signal, said second path comprising:
   a second preamplifier;
   a second summing node coupled to said second preamplifier and operable to apply a second feedback to its input signal based on a previously generated data sample; and
   a second latch coupled to said second summing node; and
   a multiplexer coupled to said first latch and said second latch, said multiplexer operable to select an output between an output of said first latch and an output of said second latch based on an exclusive OR of a first and a second previously generated data samples.

4. The apparatus of claim 1, wherein said DFE block comprises:
   a first path coupled to said input signal, said first path comprising:
   a first preamplifier operable to offset said input signal by a first predefined constant value;
   a first summing node coupled to said first preamplifier; and
   a first latch coupled to said summing node;
   a second path coupled to said input signal, said second path comprising:
   a second preamplifier operable to offset said input signal by a second predefined constant value;
   a second summing node coupled to said second preamplifier;
   a second latch coupled to said second summing node; and
   a multiplexer coupled to said first latch and said second latch, said multiplexer operable to select between an output of said first latch and an output of said second latch based on a previously generated data sample.

5. The apparatus of claim 1, wherein said second module comprises:
   a phase detector operable to receive said edge signal and generate a plurality of delta phases therefrom;
   a loop filter coupled to said phase detector operable to average said plurality of delta phases and generate a phase code; and
   a phase interpolator coupled to said loop filter operable to generate said data sampling phase signal based upon said phase code.

6. The apparatus of claim 5, wherein said plurality of delta phases are generated as a function of said edge signal, a current data sample, and a prior data sample.

7. The apparatus of claim 1, further comprising a plurality of said first modules, wherein each of said first modules operates on its own set of clocks.

8. The apparatus of claim 1, further comprising a linear equalizer configured to shape an input pulse response.

9. The apparatus of claim 1, wherein said DFE block comprises a first path coupled to said input signal and a second path coupled to said input signal, and wherein at least one of said first and second paths is configured to reduce said input signal by a predetermined voltage;
wherein said first path comprises: a first preamplifier; a first summing mode coupled to said first preamplifier; and a first latch coupled to said first summing mode; and
wherein said second path comprises: a second preamplifier; a second summing mode coupled to said second preamplifier; and a second latch coupled to said second summing mode.

10. An apparatus for arriving at a clock and data recovery settling point of a data sampling point signal, said apparatus comprising:
a receiver coupled to receive an input signal and comprising:
a decision feedback equalization block (DFE) operable to employ DFE on said input signal and generate an edge sample signal from said input signal using a first clock signal, wherein said DFE block comprises:
a first path coupled to said input signal and a second path coupled to said input signal, and wherein at least one of said first and second paths is configured to reduce said input signal by a predetermined voltage;
wherein said first path comprises: a first preamplifier; a first summing mode coupled to said first preamplifier; and a first latch coupled to said first summing mode; and wherein said second path comprises: a second preamplifier; a second summing mode coupled to said second preamplifier; and a second latch coupled to said second summing mode; and
a multiplexer coupled to said first latch and said second latch, said multiplexer outputting said edge sample signal by selecting between an output of said first latch and an output of said second latch using a previously generated data sample; and
a timing recovery module coupled to said receiver that generates a data sampling phase signal based on said edge sample signal.

11. The apparatus of claim 10, wherein said receiver further comprises:
a first branch operable to apply DFE to said input signal to generate said edge sample signal using said first clock signal, wherein said edge sample signal influences a settling point of said data sampling signal;
a second branch operable to generate an error sample signal using a second clock signal; and
a third branch operable to generate a data sample signal using said second clock signal.

12. The apparatus of claim 10, wherein said timing recovery module comprises:

a phase detector operable to receive said edge sample signal and generate a plurality of delta phases therefrom;
a loop filter coupled to said phase detector operable to average said plurality of delta phases and generate a phase code; and
a phase interpolator coupled to said loop filter operable to generate said phase code based upon values contained within a lookup table and further operable to generate said data sampling phase signal.

13. The apparatus of claim 10, wherein said receiver further comprises an odd path and an even path simultaneously processing, wherein further said odd path uses a first clock cycle and said even path uses a second clock cycle.

14. A method implemented by a receiver, said method comprising:
receiving an input signal at an input;
in a decision feedback equalization (DFE) block, applying DFE to said input signal based on prior recovered data values to generate an output DFE signal, wherein said DFE block comprises:
a first path coupled to said input signal and a second path coupled to said input signal, and wherein at least one of said first and second paths is configured to reduce said input signal by a predetermined voltage;
wherein said first path comprises: a first preamplifier; a first summing mode coupled to said first preamplifier; and a first latch coupled to said first summing mode; and wherein said second path comprises: a second preamplifier; a second summing mode coupled to said second preamplifier; and a second latch coupled to said second summing mode;
selecting between an output of said first latch and an output of said second latch to generate an edge sample signal; and
using said edge sample signal to influence a settling point of a data sampling signal.

15. The method of claim 14, wherein said using said edge sample signal further comprises:
generating a plurality of delta phases;
averaging said delta phases and generating a phase code; and
interpolating said phase code and generating a data sampling phase therefrom.

16. The method of claim 15, wherein said plurality of delta phases are generated as a function of said edge sample signal, a data value, and a prior data value.

17. The method of claim 15, wherein said phase code is generated based upon values contained within a lookup table.

18. The method claim 14, further comprising:
applying said DFE to said input signal based on prior recovered data values to generate an output DFE signal;
using a sample module clocked by a data retrieval clock signal, sampling said output DFE signal to generate a data sample signal.

19. The method of claim 14, wherein said receiver further comprises a linear equalizer configured to shape an input pulse response to compensate for feedback from said DFE.

* * * * *